United States Patent [19]
Drechsel

[11] Patent Number: 5,476,223
[45] Date of Patent: Dec. 19, 1995

[54] ROTATING JOINT FOR SPRINKLERS

[76] Inventor: Arno Drechsel, Via Castel Mareccio, 39100 Bolzano, Italy

[21] Appl. No.: 278,371

[22] Filed: Jul. 21, 1994

Related U.S. Application Data

[63] Continuation of Ser. No. 983,539, Feb. 19, 1993, Pat. No. 5,353,989.

[30] Foreign Application Priority Data

Aug. 21, 1990 [IT] Italy .................................. 85608A/90

[51] Int. Cl.⁶ ......................................................... B05B 3/16
[52] U.S. Cl. ............................................................. 239/252
[58] Field of Search ..................................... 239/252, 230, 239/233; 188/83, 17; 285/279

[56] References Cited

U.S. PATENT DOCUMENTS

| | | | |
|---|---|---|---|
| 575,016 | 1/1897 | Towne | 188/83 |
| 3,350,015 | 10/1967 | Friedmann et al. | 239/230 |
| 3,744,720 | 7/1973 | Meyer | 239/252 |
| 4,193,548 | 3/1990 | Meyer | 239/252 |
| 4,231,522 | 11/1980 | Drechsel | 239/233 |
| 4,375,279 | 3/1983 | Koch | 188/83 |
| 4,669,663 | 6/1987 | Meyer | 239/252 |
| 4,813,605 | 3/1989 | Fuller | 239/233 |

FOREIGN PATENT DOCUMENTS

| | | |
|---|---|---|
| 0097985 | 1/1984 | European Pat. Off. . |
| 2653357 | 4/1991 | France . |
| 1151145 | 7/1963 | Germany . |
| 593652 | 5/1959 | Italy . |

*Primary Examiner*—Karen B. Merritt

[57] ABSTRACT

A rotating joint for a sprinkler that provides a substantially constant rate of rotation regardless of water pressure and flow rate fluctuations. The joint includes a stationary lower portion that is in fluid communication with a pipe that delivers pressurized water to the sprinkler, and a moveable upper portion rotatably connected to the stationary lower portion about a substantially vertical axis. The moveable upper portion rotates in response to tangential forces that are applied by an impulse arm carried on a barrel from which pressurized water is discharged. The rate of rotation of the moveable upper portion is controlled by a braking mechanism that includes a pair of disks rigidly attached to the stationary lower portion and a pair of breaking elements mounted on the moveable upper portion. The pair of disks are located between and are in frictional engagement with the pair of braking elements with the pair of disks being secured against rotational and axial displacement with respect to the stationary lower portion. Variations in water pressure axially displace the moveable upper portion with respect to the stationary lower portion so that a braking element exerts a frictional force on a disk that is proportional to the water pressure to result in a self-adjusting braking force.

15 Claims, 2 Drawing Sheets

ROTATING JOINT FOR SPRINKLERS

RELATED APPLICATION

This application is a continuation of application Ser. No. 07/983,539 filed Feb. 19, 1993 now U.S. Pat. No. 5,353,989.

The present invention relates to a rotating joint for sprinklers, of the type used to perform irrigation on an entire circumference or on partial sectors. Conventional sprinklers of this type are generally placed on trolleys, or supporting frames, and comprise means for connecting a pressurized water column to a rotating joint, which in turn supports an assembly which rotates about the axis of the joint. The assembly is essentially formed by a tubular body which has, at one open end, an adapted nozzle for generating a jet which is inclined with respect to the axis of rotation of the assembly. Propulsion and jet-breaking means are mounted on the tubular body and are generally constituted by one or more arms which oscillate about an axis which is substantially perpendicular to the axis of rotation of the assembly and have one end suitable for periodically interacting with the jet.

At the end affected by the jet, each oscillating arm is provided with one or more deflectors suitable for partially deflecting the jet, generating reaction forces which have components which are parallel and perpendicular to the axis of rotation of the assembly and cause a periodic oscillation of the arm and a stepwise rotary motion of the entire assembly. In order to prevent the uncontrolled rotation of the assembly in excessively large incremental steps, which would not allow an effective irrigation, an adapted brake device is inserted in the rotating joint which supports the assembly, for contrasting the rotation of the assembly about its own main axis.

An essential requirement for sprinklers of the above described type is that the rotation rate of the rotating assembly must be approximately constant as the pressure and flow-rate of the jet and the attitude of the sprinkler vary. In fact, if the axis of rotation of the sprinkler is inclined with respect to the vertical, the components of the reaction forces and of the braking forces may vary, altering the rotation rate of the sprinkler, with consequent modifications and non-uniformities in the irrigation conditions.

Some sprinklers of the above described type are known which satisfactorily perform their task; however, they can furthermore be improved so as to eliminate some acknowledged disadvantages.

One of these disadvantages is constituted by the substantial non-uniformity in the operation of sprinklers at low water feed pressures, which become increasingly necessary in order to reduce facility management costs and in general to limit energy consumption. This non-uniformity in operation is furthermore always present in the initial startup step, since in practical use the pressure of the feed water must be increased gradually, passing from a minimum value to a maximum one. During this transient, the propulsion arm of the sprinkler, which is initially motionless, starts to oscillate with a limited frequency and extent which increase gradually up to the steady-state values. Correspondingly, the interruptions of the jet are initially nil or minimal and increase progressively until they become complete and constant. Now, if the sprinkler is not designed correctly, this transient condition can last for an excessively long and sometimes indefinite time, with the consequence that the jet is not interrupted and digs a hole in the ground, irreparably damaging the crops.

A further disadvantage of known sprinklers consists of the fact that the intervals for the adjustment of the oscillation frequency and of the rotation rate of the assembly are rather limited, unless the balancing of the oscillating arms is changed. In order to perform this operation, devices for modifying the position of the counterweights arranged on the arm are generally provided, but these mechanisms are very complicated and require the use of special tools or of universal implements which are not normally available in the place where the sprinkler is used.

The aim of the present invention is to overcome the disadvantages described above by a self adjusting rotating joint that provides a substantially constant rotation rate of the sprinkler, as the pressure and flow-rate of the water vary and as the inclination of the ground varies, even with considerable slope angles.

Another object of the invention is to provide a rotating joint which adjusts the rotation rate, by virtue of means mounted directly on the sprinkler, without requiring any further external equipment.

Still a further object of the invention is to provide a substantially simple rotating joint for sprinklers which can be used by personnel having no particular knowledge of sprinklers and such as to require very little maintenance, so as to be advantageous from a merely economical point of view.

This aim, these objects and others which will become apparent hereinafter are achieved by a rotating joint for sprinklers of the type described in the introductory part.

Further characteristics and advantages of the invention will become apparent from the description of a preferred but not exclusive embodiment of the rotating joint according to the invention, illustrated only by way of non-limitative example in the accompanying drawings, wherein.

Figure 1:
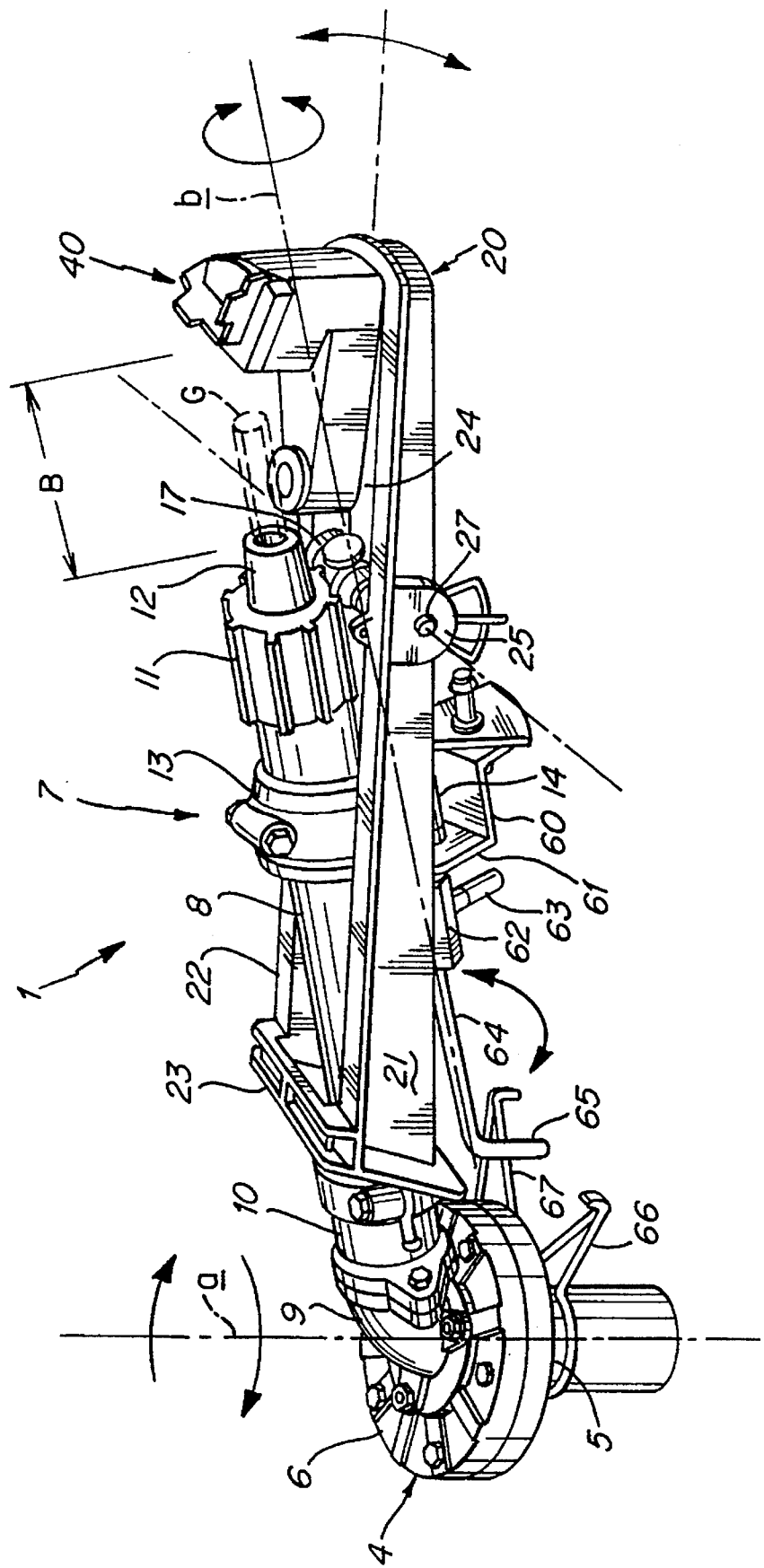
FIG. 1 is a general perspective view of a rotating sprinkler.
Figure 2:
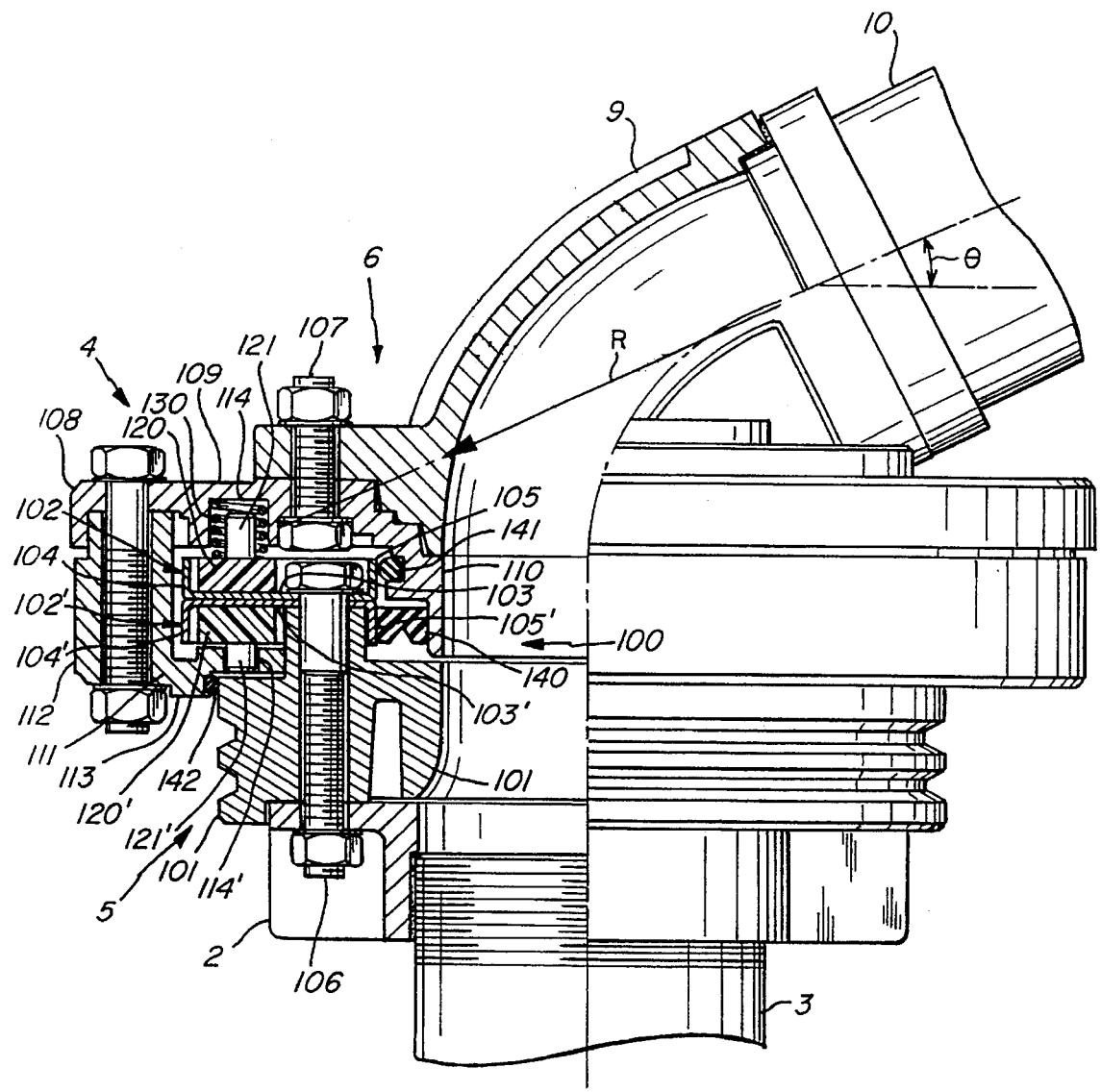
FIG. 2 is a partially enlarged sectional view of the brake device of the sprinkler according to the invention, taken along a vertical plane which passes through the axis of rotation of the assembly.

With reference to the figures, a sprinkler, generally indicated by the reference numeral 1, is connected by means of a connecting element 2 to a pipe 3 for feeding pressurized water. A rotating joint, generally indicated by the reference numeral 4, is fixed on the connecting element 2 and comprises a fixed lower portion 5, which is bolted to the element 2, and an upper movable portion 6, which supports a rotating assembly generally indicated by the reference numeral 7. The rotation axis a of the joint 4, which is approximately but not necessarily vertical, determines the rotation axis of the assembly 7.

The assembly 7 substantially comprises a barrel 8 connected to the upper portion 6 of the joint 4 by means of an elbow coupling 9, which has an angle θ between the outlet and the inlet so as to incline the barrel 8 with respect to the vertical, and a substantially cylindrical connecting stub pipe 10. A nozzle or nosepiece 12 is fixed to the tubular body 8 at its end portion by means of a ring 11 or the like and has an adapted profile and internal diameter so as to obtain a jet with a preset flow-rate and range according to the pressure of the water.

An oscillating arm 20 is pivoted on the head 17 and, in an exemplifying form illustrated in FIG. 1, is; constituted by an approximately rectangular frame which is formed by two lateral members 21, 22, arranged on opposite sides with respect to the barrel 8, which are rigidly connected to one another by a rear cross-member 23 and by a front plate 24. The arm may pivot by means of a pair of lateral supports 25, which are crossed by a single axle or by lateral pivots 27.

A deflector 40 is arranged on the plate 24 at a distance B from the nozzle 12 in equilibrium conditions so as to periodically interact with the jet G.

The sprinkler of the illustrated example also has means for reversing the direction of rotation of the rotating assembly 7 after covering a preset angle. For this purpose, an approximately Z-shaped bracket 60 is pivoted on the oscillation axis b and has a longitudinal portion which is adjacent to the seat 14 of the support 13. An elongated nut 62 is provided at the rear transverse end 61 of the bracket 60 and retains an actuation rod 64 by means of a stop screw 63. The free end 65 of the rod 64 is conveniently shaped so as to be able to interact with two radial stroke limit protrusions, constituted for example by the folded ends of two open rings 66, 67 which are rigidly associated with the fixed lower portion 5 of the joint 4.

According to the invention, the rotating joint 4 comprises a self-adjusting brake structure, generally indicated by the reference numeral 100, particularly but not exclusively intended for use in the sprinkler illustrated in FIG. 1. The connecting element 2 fixed to the water feed pipe 3 can be of the flanged type or of the type with an inner thread, made of brass or of another equivalent material, and is anchored to a torus-like body 101 made of aluminum or the like, with a tapered internal surface which is connected to the connecting element 2.

A pair of braking disks 102, 102' made of stainless steel are arranged on the torus-like body 101; said disks have planar portions 103, 103' and inner and outer cylindrical annular portions, respectively 104, 104' and 105, 105' The braking disks, the torus-like body and the flange are mutually rigidly coupled by means of bolts 106 or the like so as To define, as a whole, a stationary or fixed portion 5 of the joint.

In the upper portion of the figure, the elbow coupling 9 is fixed by means of bolts 107 to a cover 108 which has a planar portion 109 and a cylindrical tubular portion 110 with an internal diameter which is equal to that of the torus-like body 101.

The cover 108 is in turn anchored to a bottom 111 with a cylindrical lateral portion 112 and a planar portion 113. On the respective planar portions 109 and 113, which face the planar surfaces 103, 103' of the braking disks 102, 102', the cover 108 and the bottom 111 have respective series of cylindrical cavities 114, 114' which are angularly spaced. Two braking rings 120, 120' are interposed between the disks and the planar walls of the cover and of the bottom. The rings are made of wearproof synthetic material and have cylindrical protrusions or dowels 121, 121' which engage in the respective cavities 114,114', so as to ensure the traction of the rings 120,120' by the rotating portion of the joint. Helical springs 130 are also provided in the cavities 114 for the dowels 121 of the upper ring 120 and exert on the upper braking ring 120 a compression force against the upper disk 102.

Gaskets of the lip type 140, or of the O-ring type 141, 142, arranged in the respective regions indicated in the drawings, are furthermore provided in order to ensure the tightness of the joint.

The assembly constituted by the elbow coupling 9, the cover 108, the bottom 111 and the braking rings 120, 120' constitutes the rotatable part of the joint. By virtue of the hydraulic pressure, the rotatable part is pushed upward, forcing the lower ring 120' against the lower disk 102' with a pressure which is proportional to that of the water. The friction between the upper ring 120 and the upper disk 102 is instead always ensured by the compression force of the springs 130, which operate even with low pressures and regardless of the attitude of the sprinkler.

Conveniently, according to the invention, the angle of incidence θ and the configuration of the elbow coupling 9 are preset so that the line of action of the reaction force R generated by the jet on the barrel is directed substantially toward the region of contact of the rings and of the disks and also acts on the cylindrical lateral surfaces of these elements. The simultaneous presence of all these forces ensures that the braking action on the joint is self-adjusted and substantially proportional to the pressure of the water as well as to the composition of the reaction forces which act on the sprinkler, achieving the aim of the invention.

It is also noted that the line of action of the resultant of the reaction forces R on the joint 6 has the minimum lever arm allowed by the geometry of the system, producing an overturning torque which is centered in an axial region of the joint, proximate to the gaskets 140,141 and 142, with consequent minimal stresses and local deformations of said gaskets.

The rotating joint thus conceived is susceptible to numerous modifications and variations, all of which are within the scope of the inventive concept expressed by the accompanying claims; all the details may furthermore be replaced with technically equivalent elements, For example, the braking rings inserted in the rotating joint can be executed in a plurality of separate segments instead of in a monolithic structure.

I claim:

1. A self-adjusting rotating joint for a sprinkler, said joint comprising:

a stationary lower portion in fluid communication with a pipe that delivers pressurized water to said sprinkler;

a movable upper portion rotatably connected to said stationary lower portion about a substantially vertical axis and being arranged for axial displacement with respect to said stationary lower portion, said movable upper portion being connected to a barrel through which said pressurized water is discharged in the form of a jet, said barrel carrying an impulse arm that imparts instantaneous tangential forces to said movable upper portion causing rotation of said movable upper portion; and a braking mechanism that acts upon said movable upper portion to control said rotation thereof in response to said instantaneous tangential forces, said braking mechanism including an annular member rigidly attached to said stationary lower portion, an upper braking element and a lower braking element both mounted on said movable upper portion, said upper braking element and said lower braking element acting on opposite sides of said annular member, wherein said annular member includes an upper disk and a lower disk located between said upper braking element and said lower braking element and arranged for frictional engagement therewith, said upper disk and said lower disk being secured against rotational and axial displacement with respect to said stationary lower portion, whereby variations in water pressure cause axial displacement of said movable upper portion with respect to said stationary lower portion so that said lower braking element exerts a frictional force on said lower disk that is proportional to said water pressure to result in a self-adjusting braking force.

2. The self-adjusting rotating joint according to claim 1, wherein said upper and lower disks have a substantially U-shaped radial cross-section including a planar annular portion and a pair of cylindrical edges.

3. The self-adjusting rotating joint according to either claim 1 or 2, wherein said upper and lower braking elements each comprises an annular body having planar faces on opposite sides thereof, said annular body including a series of substantially cylindrical angularly spaced protrusions arranged on one of said planar faces and intended to be accommodated in corresponding cavities defined in said movable upper portion to be pulled along by said rotation of said movable upper portion.

4. The self-adjusting rotating joint according to either of claims 1 or 2 wherein said movable upper portion comprises an upper cover and a bottom, resilient means being arranged between said upper cover and said upper braking element, said resilient means being suitable for compressing said upper braking element against said upper disk.

5. The self-adjusting rotating joint according to claim 4 wherein said lower braking element is rigidly associated with said bottom.

6. The self-adjusting rotating joint according to either of claims 1 or 2 wherein said movable upper portion includes an elbow coupling connected to said barrel, said elbow coupling having an angle of incidence such that said jet of water is discharged from said barrel with an energy that generates reaction forces that have a resultant force with a line of action that is substantially directed toward said braking elements and said disks so as to vary said braking force in proportion to said energy of said jet.

7. The self-adjusting rotating joint according to claim 6 further comprising a plurality of gaskets arranged between said upper disk, said lower disk and said movable upper portion to seal said joint, wherein said resultant force has a lever arm with respect to said joint, such that said resultant force produces an overturning torque that is approximately centered in an axial region of said joint and proximate to said plurality of gaskets to minimize stresses and local deformations in said plurality of gaskets.

8. The self-adjusting rotating joint according to claim 6 wherein said angle of incidence of said elbow coupling can be varied in order to discharge said jet at various angles.

9. The self-adjusting rotating joint according to claim 1, wherein said lower braking element is secured against rotational and axial displacement with respect to said movable upper portion and said upper braking element is secured against rotational displacement with respect to said movable upper portion, said upper braking element capable of limited axial displacement with respect to said movable upper portion using resilient means for biasing said upper braking element to maintain contact with said upper disk.

10. The self-adjusting rotating joint according to claim 1, wherein said upper braking element and said lower braking element are substantially planar disks of wearproof synthetic material.

11. The self-adjusting rotating joint according to claim 1, further comprising a plurality of gaskets arranged between said upper disk, said lower disk and said movable upper portion to seal said joint.

12. The self-adjusting rotating joint according to claim 11, wherein said lower disk has an inner edge and said movable upper portion has an opposed edge facing said inner edge, and wherein at least one of said plurality of gaskets is a lip seal disposed between said inner edge and said opposed edge.

13. A self-adjusting rotating joint for a sprinkler, said joint comprising:

a stationary lower portion for attaching said sprinkler to a pressurized water source;

a movable upper portion rotatably connected to said stationary lower portion about a substantially vertical axis;

rotating means attached to said movable upper portion for imparting rotational forces to said movable upper portion causing rotation thereof;

a braking mechanism that acts upon said movable upper portion to control said rotation thereof in response to said rotational forces, said braking mechanism including a brake disk rigidly attached to said stationary lower portion and at least one braking element mounted on said movable upper portion, said brake disk being secured against rotational and axial displacement with respect to said stationary lower portion, said at least one braking element being in frictional engagement with one side of said brake disk; and displacing means disposed on said movable upper portion and said stationary lower portion for enabling axial displacement of said movable upper portion with respect to said stationary lower portion in response to variations in water pressure so that said at least one braking element exerts a frictional force on said brake disk that is proportional to said water pressure.

14. The self-adjusting rotating joint according to claim 13, wherein the braking mechanism further includes a second braking element in frictional engagement with a second side of said brake disk.

15. The self-adjusting rotating joint according to claim 14, wherein said movable upper portion includes an upper cover and resilient means disposed between said upper cover and said second braking element for biasing said second braking element against said second side of said brake disk.

* * * * *